(12) United States Patent
Higuchi

(10) Patent No.: US 10,954,601 B2
(45) Date of Patent: Mar. 23, 2021

(54) METHOD OF PRODUCING DIE, DIE, AND INTERIOR COMPONENT OF VEHICLE

(71) Applicant: TOYOTA BOSHOKU KABUSHIKI KAISHA, Aichi-ken (JP)

(72) Inventor: Yasuhito Higuchi, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 193 days.

(21) Appl. No.: 15/465,025

(22) Filed: Mar. 21, 2017

(65) Prior Publication Data

US 2017/0292201 A1 Oct. 12, 2017

(30) Foreign Application Priority Data

Apr. 8, 2016 (JP) .............................. JP2016-078084

(51) Int. Cl.
| | |
|---|---|
| *C25D 5/36* | (2006.01) |
| *B60R 13/02* | (2006.01) |
| *C25F 3/06* | (2006.01) |
| *C23F 1/16* | (2006.01) |
| *C25D 3/04* | (2006.01) |

(52) U.S. Cl.
CPC ............ *C25D 5/36* (2013.01); *B60R 13/0243* (2013.01); *C23F 1/16* (2013.01); *C25D 3/04* (2013.01); *C25F 3/06* (2013.01)

(58) Field of Classification Search
CPC .......... B60R 13/0243; C23F 1/16; C25F 3/06; C25D 5/36; C25D 3/04; B21C 25/02–025
USPC ..................................... 72/343; 425/461–467
See application file for complete search history.

(56) References Cited

U.S. PATENT DOCUMENTS

| | | | |
|---|---|---|---|
| 6,136,456 A | 10/2000 | Komatsubara et al. | |
| 2010/0206037 A1* | 8/2010 | Yagi | B21D 37/20 72/343 |
| 2011/0117236 A1* | 5/2011 | Uemura | B28B 3/269 425/461 |
| 2013/0141792 A1* | 6/2013 | Ueda | B29C 33/424 359/599 |
| 2015/0168610 A1 | 6/2015 | Fukui et al. | |

FOREIGN PATENT DOCUMENTS

| | | |
|---|---|---|
| JP | 59-131414 | 7/1984 |
| JP | 8-72065 | 3/1996 |
| JP | 2005-29878 | 2/2005 |
| JP | 2010-017913 | 1/2010 |

OTHER PUBLICATIONS

Foreign Official Action received in German Patent Application No. 10 2017 107 315.9, dated Feb. 11, 2019.
Office Action issued in Japan Counterpart Patent Appl. No. 2016-078084, dated Sep. 19, 2019, along with an English translation thereof.

* cited by examiner

*Primary Examiner* — Maria V Ewald
*Assistant Examiner* — Ethan Weydemeyer
(74) *Attorney, Agent, or Firm* — Greenblum & Bernstein, P.L.C.

(57) ABSTRACT

A method of producing a die for forming an interior component of a vehicle includes: setting a temperature of a plating bath in a range from 25 to 40° C.; immersing at least a forming surface on a base for the die in the plating bath; and feeding a current to the base with a current density in a range from 20 to 80 A/dm² until a metal layer is formed on the forming surface.

12 Claims, 15 Drawing Sheets

FIG.12

|  | EMBODIMENT | COMPARATIVE EXAMPLE |
|---|---|---|
| PLATING BATH TEMPERATURE (°C) | 37 | 60 |
| CURRENT DENSITY ( A / dm² ) | 60 | 85 |
| BRIGHTNESS ( L* ) | 21.85 | 25.65 |

METHOD OF PRODUCING DIE, DIE, AND INTERIOR COMPONENT OF VEHICLE

CROSS REFERENCE TO RELATED APPLICATION

This application claims priority from Japanese Patent Application No. 2016-078084 filed on Apr. 8, 2016. The entire contents of the priority application are incorporated herein by reference.

TECHNICAL FIELD

The present disclosure relates to a method of producing a die, a die, and an interior component of a vehicle.

BACKGROUND

A forming apparatus for forming an interior component of a vehicle using a set of dies is known (see Patent Document 1). The forming apparatus includes the set of dies that can be opened and closed. When the dies are closed, a forming cavity for forming the interior component is provided.

It may be preferable to tinge the interior component with black from the aspect of design. To deepen the blackness of the interior component, black paint may be applied to a surface of the interior component after the interior component is formed with the set of dies. Use of the paint requires application and drying, that is, the larger number of steps is required for producing the interior component.

SUMMARY

The present invention was made in view of the foregoing circumstances. An object is to deepen color of an interior component of a vehicle without using paint.

A method of producing a die for forming an interior component of a vehicle includes: setting a temperature of a plating bath in a range from 25 to 40° C.; immersing at least a forming surface on a base for the die in the plating bath; and feeding a current to the forming surface with a current density in a range from 20 to 80 A/dm² until a metal layer is formed on the forming surface.

According to a technology described herein, the color of the interior component deepens without using paint.

BRIEF DESCRIPTION OF THE DRAWINGS

FIG. 12 is a table including results of brightness measurement.

DETAILED DESCRIPTION

First Embodiment

A first embodiment will be described with reference to FIGS. 1 to 14. A forming apparatus for producing an interior component 50 for an automobile (an interior component for a vehicle) will be described. The interior component 50 is made of synthetic resin (e.g., thermoplastic resin including polypropylene) and in black. The interior component 50 may be a trim board included in a door trim for an automobile (e.g., an upper trim board, a lower trim board).

Figure 1:
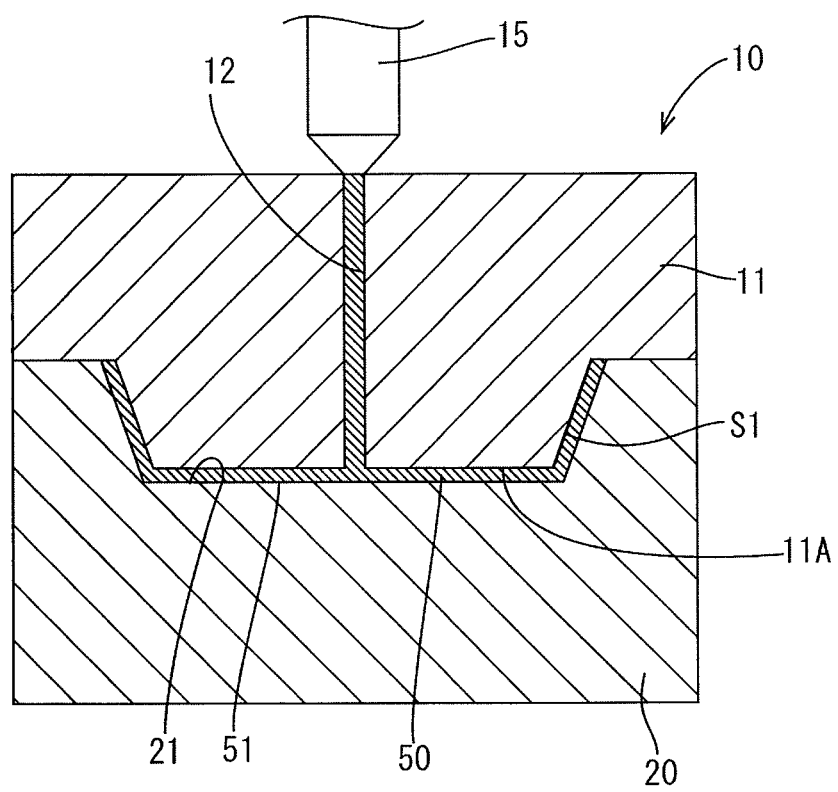
FIG. 1 is a cross-sectional view of a forming apparatus according to a first embodiment.

As illustrated in FIG. 1, a forming apparatus 10 includes an injector 15 and a forming die set including a first die 11 and a second die 20. The first die 11 and the second die 20 can be opened and closed. The first die 11 includes a forming surface 11A for forming a back surface of the interior component 50. The second die 20 includes a forming surface 21 for forming a design surface 51 of the interior component 50 (a surface to face an interior of a cabin). When the first die 11 and the second die 20 are closed, a forming cavity S1 is created between the forming surface 11A and the forming surface 21 that are opposed to each other. A contour of the forming cavity S1 is along a contour of the interior component 50. A runner 12 is provided inside the first die 11. Molten plastic injected from the injector 15 run into the forming cavity S1 via the runner 12.

Figure 2:
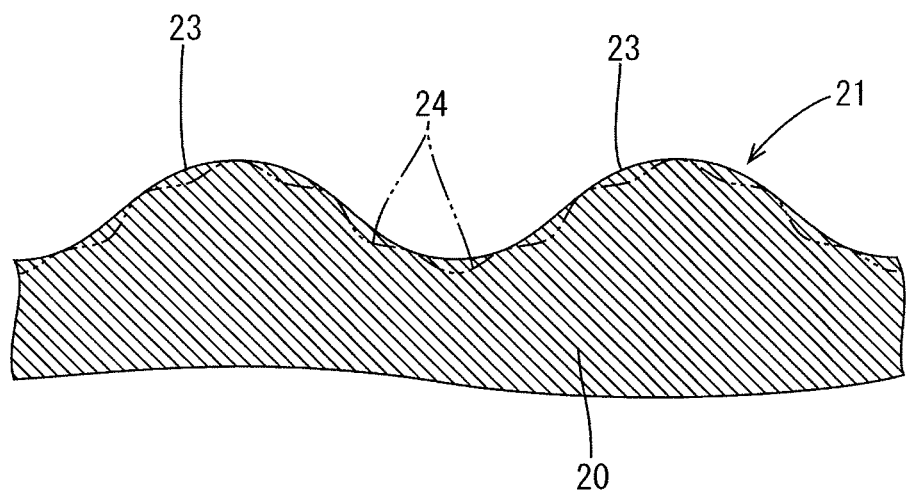
FIG. 2 is a cross-sectional view of a die with recesses formed in an emboss pattern forming process.
Figure 3:
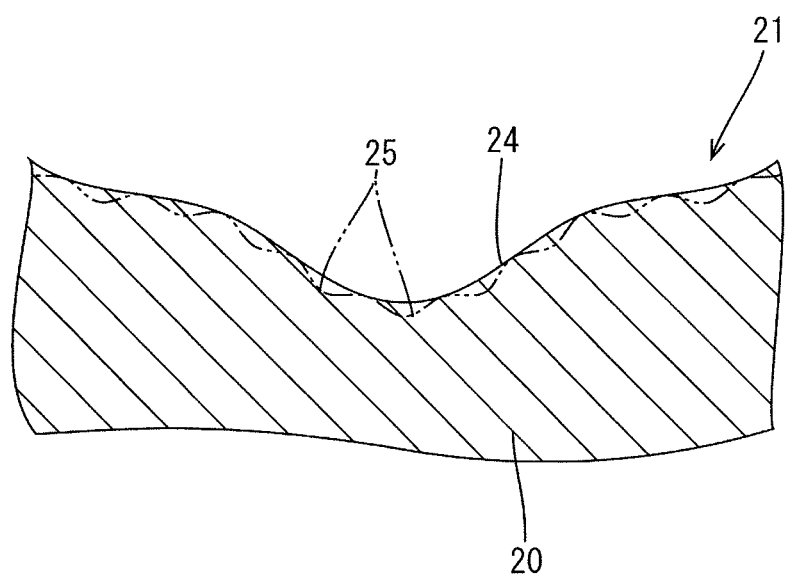
FIG. 3 is a cross-sectional view of the die with recesses formed in a sandblasting process.
Figure 4:
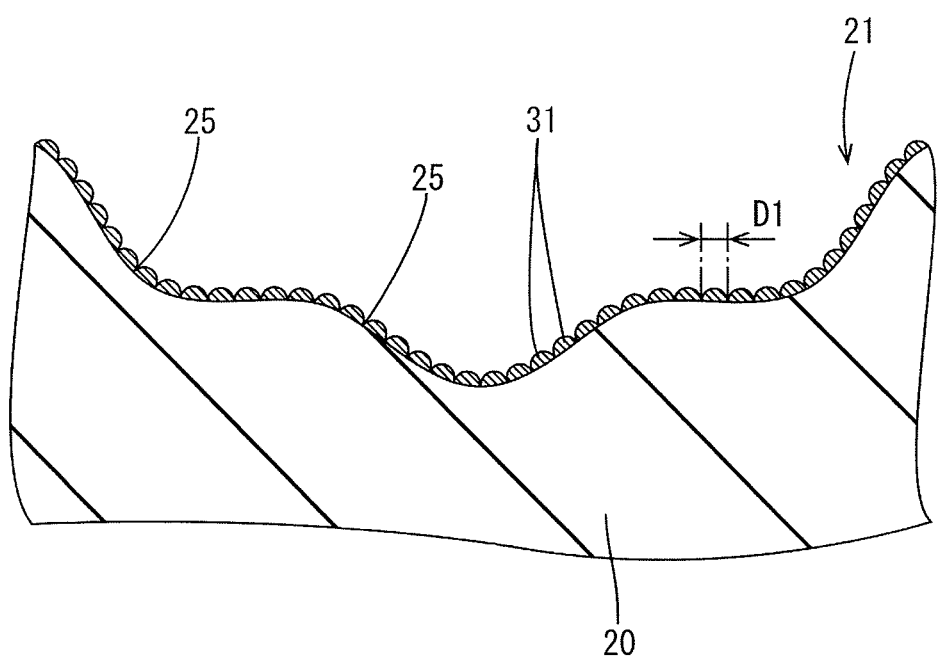
FIG. 4 is a cross-sectional view of a metal layer formed on the forming surface of the die by plating.

As illustrated in FIGS. 2 and 3, the forming surface 21 of the second die 20 includes three types of recesses including first recesses 23, second recesses 24, and third recesses 25 formed by different forming methods. The recesses 23 to 25 are formed over an entire area of the forming surface 21. As illustrated in FIG. 4, a metal layer 31 is formed to cover the forming surface 21 including the recesses 23, 24, and 25. The metal layer 31 includes grains with a mean grain size D1 of 5 μm or smaller.

The first recesses 23 are for forming an emboss pattern on the interior component 50 with chemical etching. The second recesses 24 are smaller than the first recesses 23. The second recesses 24 are formed by sandblasting. The third recesses 25 are smaller than the second recesses 24. The third recesses 25 are formed by electroetching. Methods of forming the recesses 23 to 25 and the metal layer 31 will be described later. Sizes of the recesses 23 to 25 described above are only an example and not limited thereto. In FIGS. 2 and 3, solid lines indicate the recesses larger than the other and two-dot chain lines indicate the recesses smaller than the other.

Figure 5:
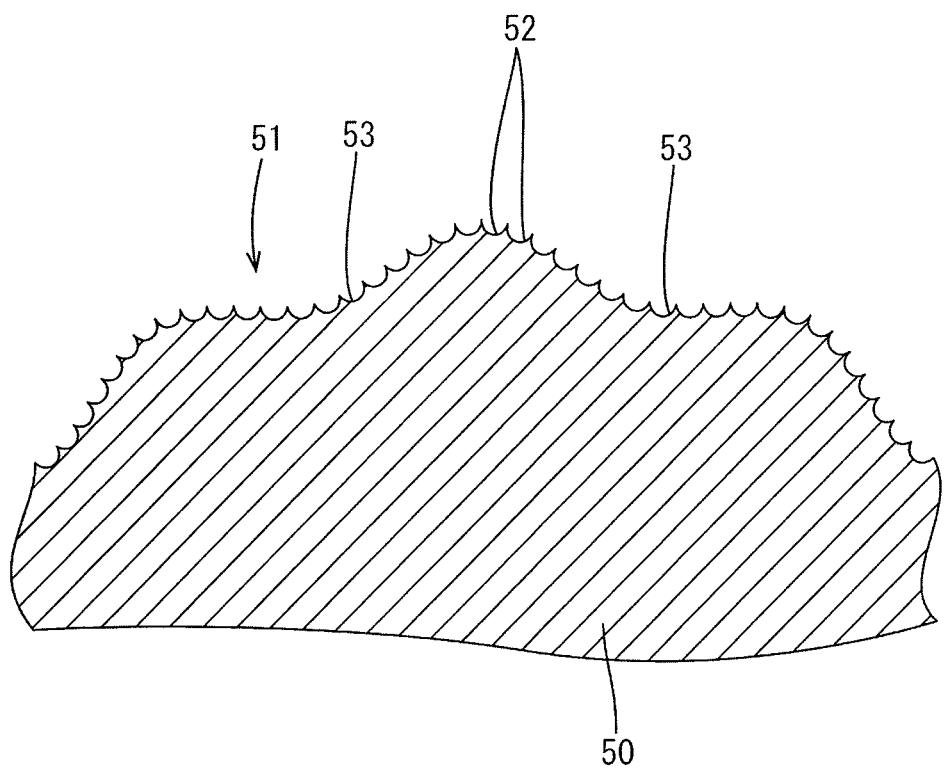
FIG. 5 is a magnified cross-sectional view of a design surface of an interior component of an automobile.

As illustrated in FIG. 5, the design surface 51 of the interior component 50 includes a pattern transferred from the forming surface 21. A first irregular pattern 52 in FIG. 5 is formed with protrusions in the metal layer 31. A second irregular pattern 53 that is coarser than the first irregular pattern 52 is formed with the third recesses 25 in the forming surface 21.

Next, a method of producing the second die 20 will be described. The method of producing the second die 20 includes a cutting process, an emboss pattern forming process, a sandblasting process, an etching process, and a plating process. The cutting process is for cutting a steel block (a base of the second die 20) to create a base surface that is a base for the forming surface 21. The emboss pattern forming process is for forming the first recesses 23. The sandblasting process is for forming the second recesses 24. The etching process is form forming the third recesses 25. The plating process is for forming the metal layer 31. The steel of the second die 20 may contain iron as a main ingredient. The steel may further contain carbon, silicon, manganese, phosphorus, and sulfur.

Emboss Pattern Forming Process

Figure 6:
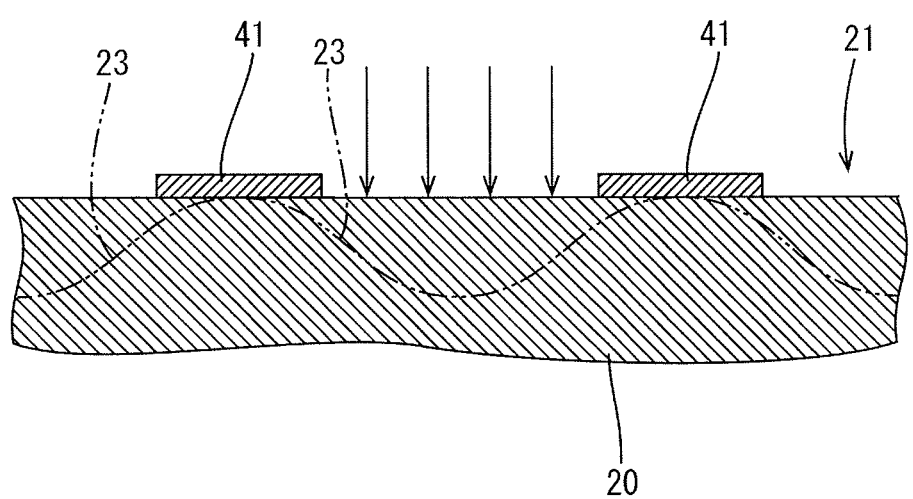
FIG. 6 is a cross-sectional view illustrating the emboss pattern forming process.

In the emboss pattern forming process, the first recesses 23 are formed by etching. The etching uses an acid solution and an acid-resistant ink 41. The acid solution is for corroding metal in the base of the second die 20. The acid-resistant ink 41 is for blocking the acid solution, for example, a nitric acid solution. The base of the second die 20 is cleaned and portions of the base other than the base surface for the forming surface 21 are masked off with a masking tape. As illustrated in FIG. 6, the emboss pattern is transferred to the base surface with the acid-resistant ink 41. The base surface is subject to the acid solution. Portions of the base surface covered with the acid-resistant ink 41 are not corroded with the acid solution and other portions of the base surface not covered with the acid-resistant ink 41 are corroded with the acid solution to form recesses. Through the process, the first recesses 23 are formed in the base surface.

Sandblasting Process

Figure 7:
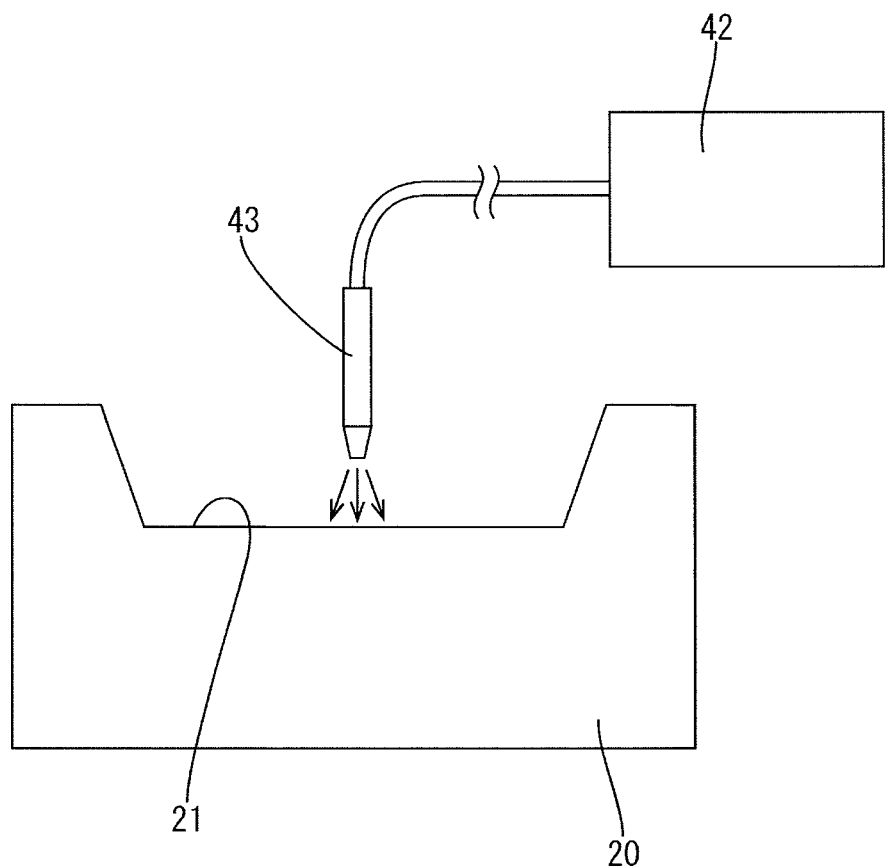
FIG. 7 is a schematic view illustrating the sandblasting process.

The sandblasting process is performed after the emboss pattern forming process. In the sandblasting process, the second recesses 24 are formed by sandblasting. As illustrated in FIG. 7, an abrasive is sprayed onto the base surface including the first recesses 23 via a nozzle 43 using compressed air generated by a compressor 42. The base surface is scraped by the abrasive and the second recesses 24 are formed (see FIG. 2). The abrasive may have a grit size in a range from #80 to #150 in Japanese Industrial Standards. In comparison to an abrasive having a smaller grit size (e.g., in a range from #150 to #250 in Japanese Industrial Standards), diameters of grains in the abrasive are larger and thus larger impact is applied to the base surface. Therefore, the second recesses 24 are easily formed.

Etching Process

Figure 8:
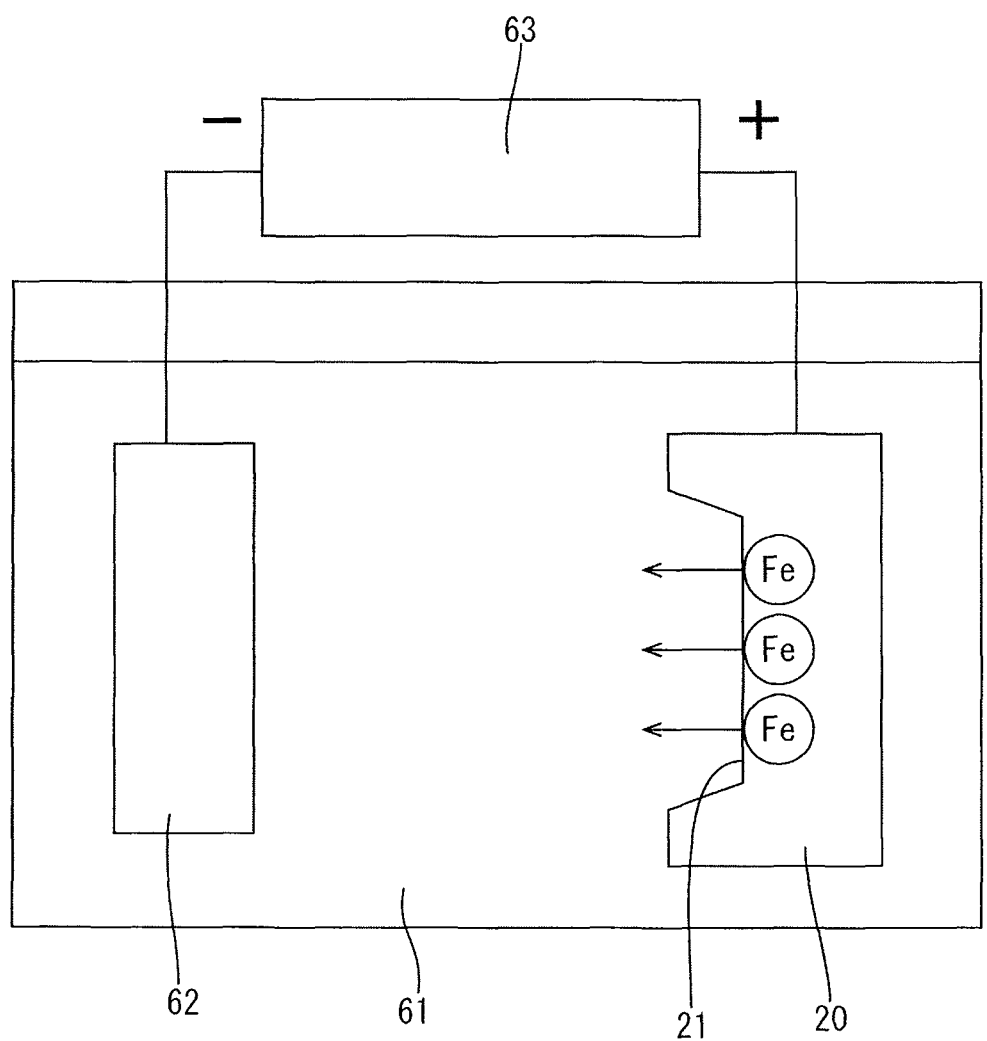
FIG. 8 is a schematic view illustrating an electroetching process.

The etching process is performed after the sandblasting process. In the etching process, the third recesses 25 are formed by etching. As illustrated in FIG. 8, the base of the second die 20 is immersed in a plating bath 61 (a chrome plating bath, a Sergeant bath) including chrome acid and sulfuric acid as the main ingredients and connected to a power source 63. The base is connected to as a positive terminal of the power source 63 and an electrode 62 in the plating bath 61 is connected to a negative terminal of the power source 63. Using the base of the second die 20 as a positive electrode and the electrode 62 as a negative electrode, electroetching is performed. The electroetching causes corrosion of an iron component included in the base and the third recesses 25 are formed in the base surface.

It is preferable to perform the electroetching with a current density in a range from 15 to 20 A/dm$^2$ and with process time in a range from 1 to 20 minutes. Under the condition, the third recesses 25 having certain sizes (e.g., diameters of 10 μm or larger) are properly formed. Through the emboss pattern forming process, the sandblasting process, and the etching process, the forming surface 21 is prepared.

Plating Process

Figure 9:
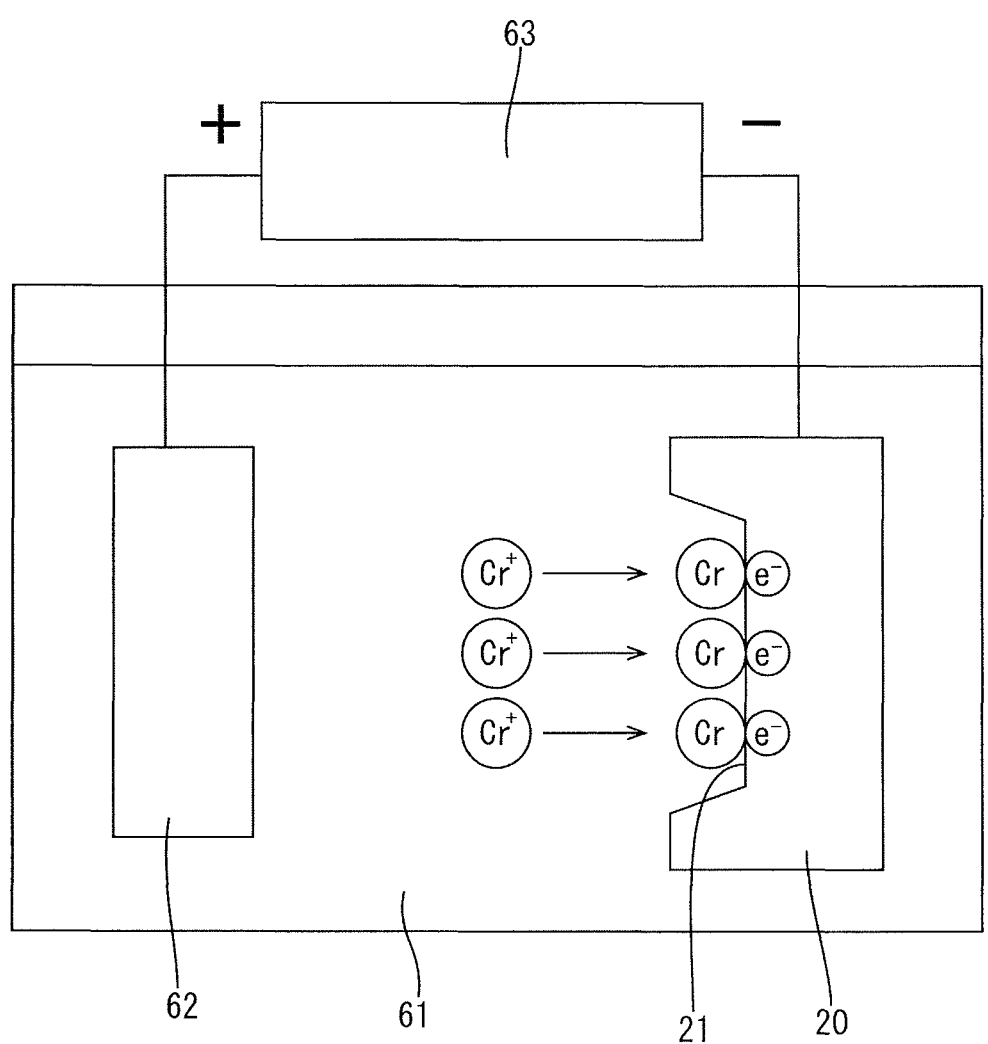
FIG. 9 is a schematic view illustrating a plating process.
Figure 10:
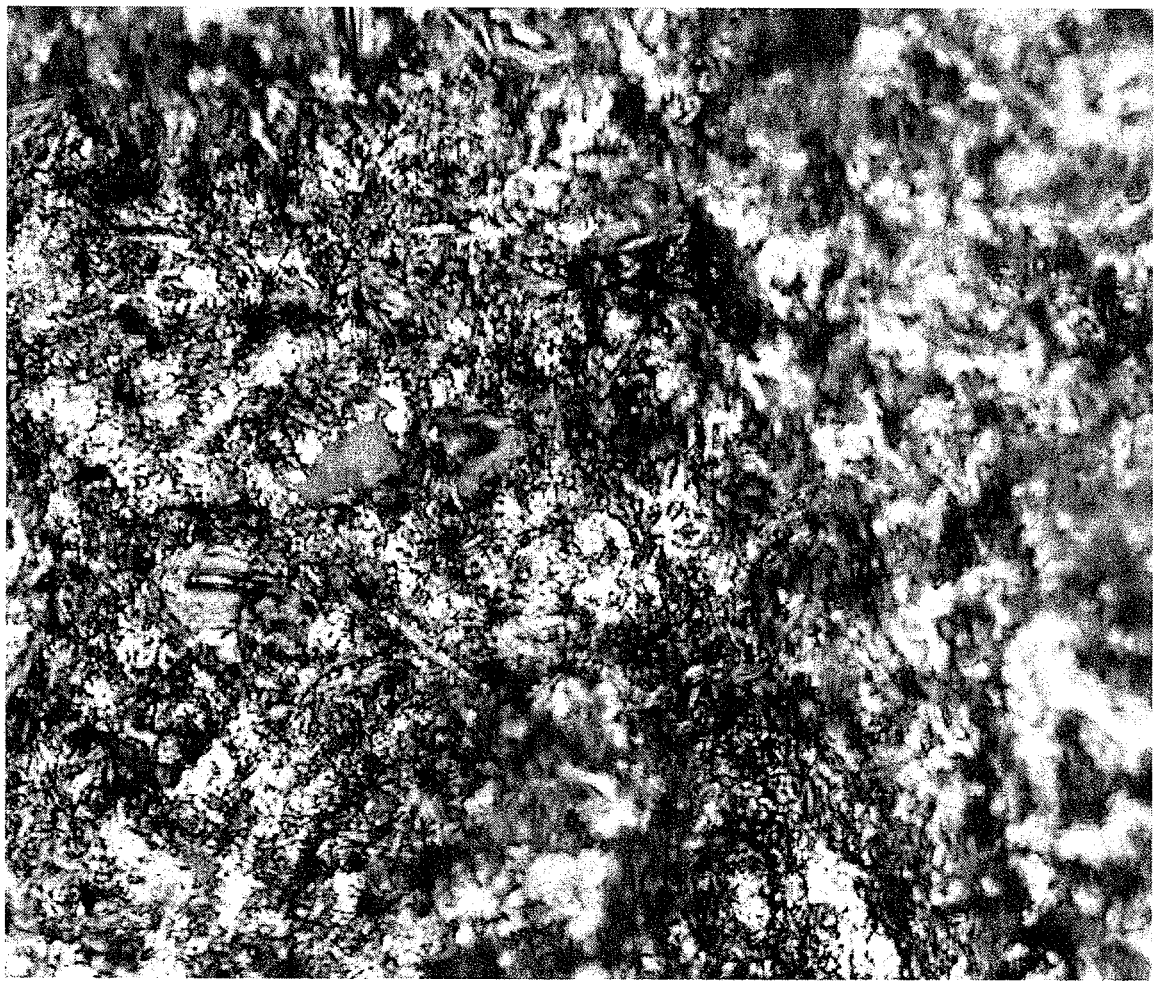
FIG. 10 is a picture of the forming surface before the etching process.
Figure 11:
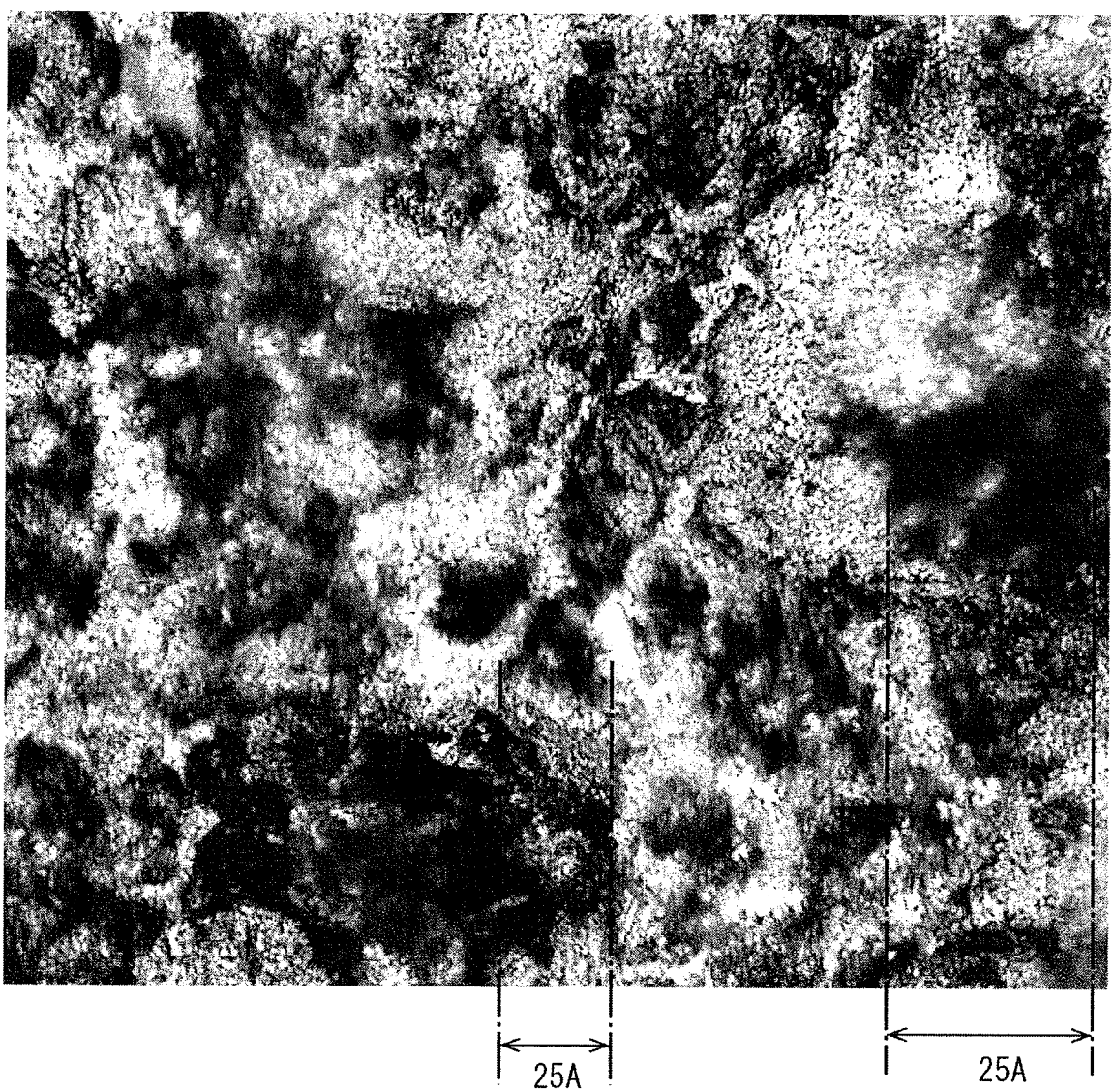
FIG. 11 is a picture of the forming surface after the etching process.

The plating process is performed after the etching process. In the plating process, the metal layer 31 is formed by electrodeposition. As illustrated in FIG. 9, the base of the second die 20 including the forming surface 21 in the plating bath 61 is connected to the negative terminal of the power source 63 and the electrode 62 is connected to the positive terminal of the power source 63. Using the base as a negative electrode and the electrode 62 as a positive electrode, the electrodeposition is performed. Chrome ions in the plating bath 61 are reduced and deposited on the forming surface 21. As a result, the metal layer 31 with a thickness of 5 μm or larger is formed. The plating is used in this embodiment is hard chrome plating to form the metal layer 31 with the thickness of 5 μm or larger but the plating is not limited to the hard chrome plating.

The design surface 51 of the interior component 50 includes a pattern transferred from a surface of the metal layer 31. By increasing the fineness of the pattern in the design surface 51 formed with the protrusions on the surface of the metal layer 31 in a reduced size, light reaching the design surface 51 is more likely to be scattered and thus the brightness of color of the design surface 51 decreases. The size of the protrusions on the surface of the metal layer 31 can be altered by adjusting the current density and a plating bath temperature of the plating bath 61. When the electroplating is performed with the current density in a range from 20 to 80 A/dm$^2$ and the plating bath temperature in a range from 25 to 40° C., the metal layer 31 with the surface having a mean grain size of 5 μm or smaller is formed. With such a metal layer 31, the brightness of color of the design surface 51 is reduced.

Figure 13:
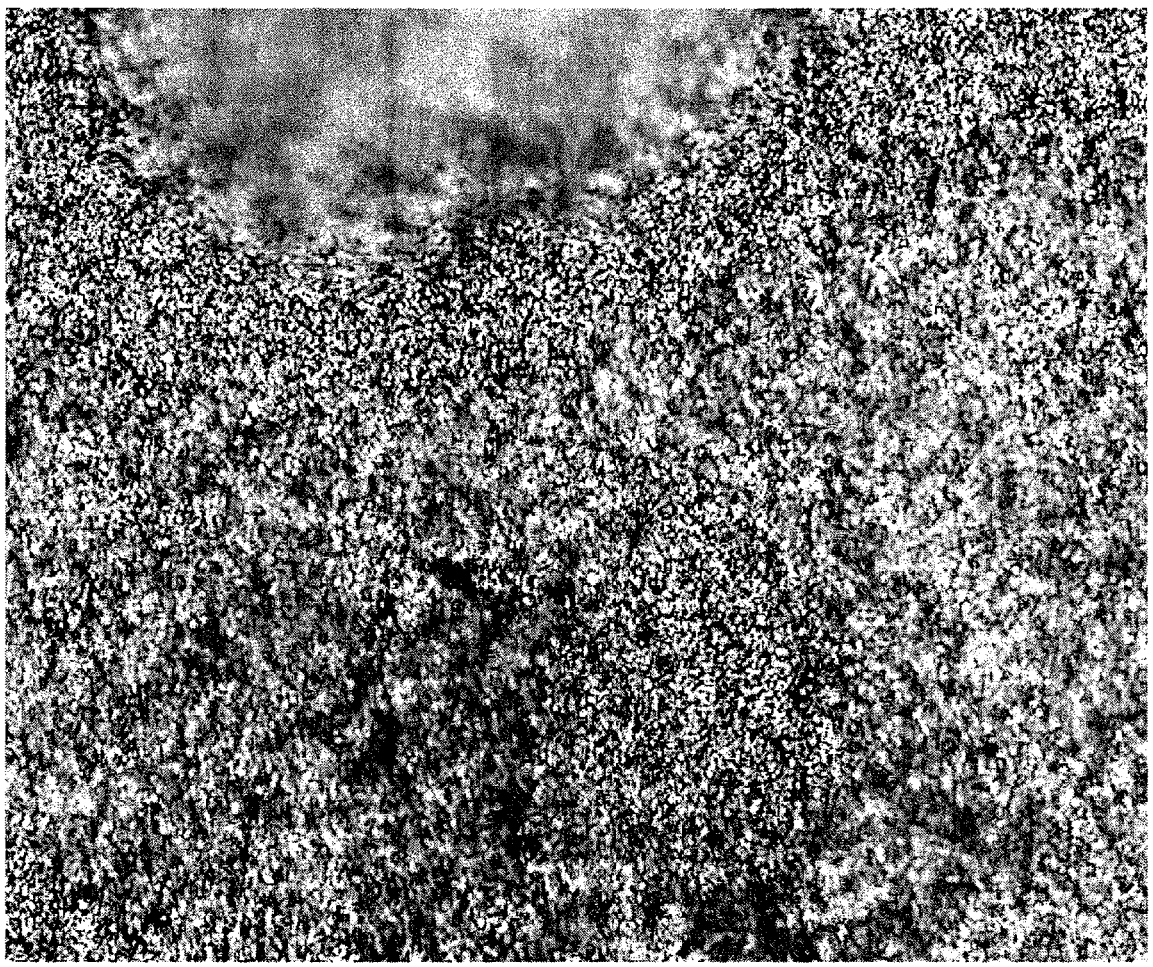
FIG. 13 is a picture of a surface of the metal layer.
Figure 14:
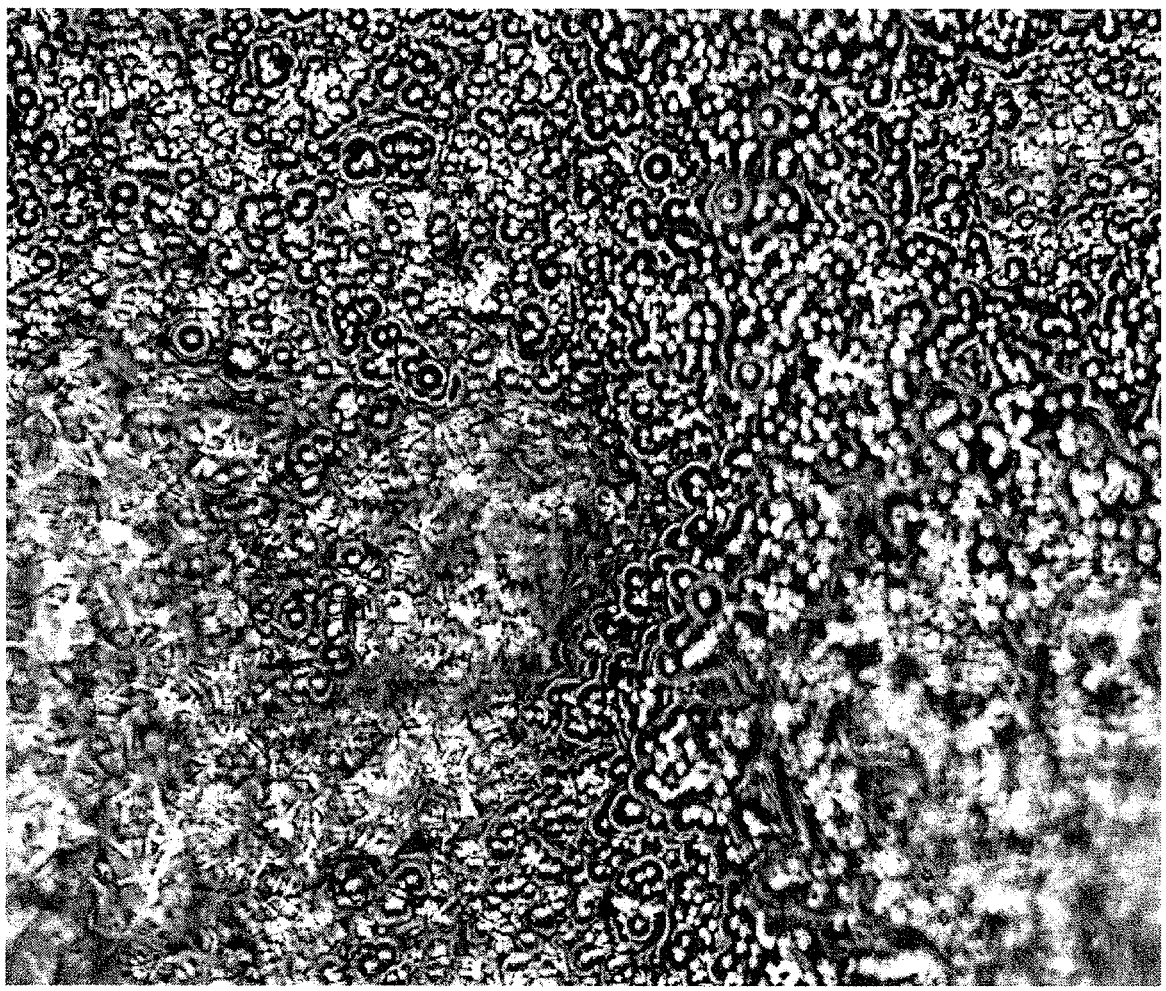
FIG. 14 is a picture of a surface of a metal layer of a comparative example.

The picture in FIG. 13 shows an image of a surface of a metal layer formed with the electroplating under a condition that the current density is 60 A/dm$^2$ and the plating bath temperature is 37° C., which is within the condition of this embodiment. The picture in FIG. 14 shows an image of a surface of a metal layer formed with the electroplating under a condition that the current density is 85 A/dm$^2$ and the plating bath temperature is 60° C., which is outside the condition of this embodiment. According to FIGS. 13 and 14, when the electroplating was performed under the condition of this embodiment, the mean grain size of the surface of the metal layer 31 was smaller, that is, the pattern was smaller. When the current density is set in a range from 30 to 60 A/dm$^2$ and the plating bath temperature is set in a range from 30 to 37° C., the finer pattern can be formed on the surface of the metal layer in comparison to a condition including the current density and the plating bath temperature outside the above ranges. Therefore, the brightness of color of the design surface 51 can be reduced.

The brightness of color of the design surface 51 of this embodiment and the brightness of color of the design surface of a comparative example formed with the forming surface including the metal layer formed by the electroplating under the condition outside the condition of this embodiment were measured with a spectrophotometer (lightness in a Lab color space). The measurements are presented in FIG. 12. According to FIG. 12, the brightness of color of the design surface 51 of this embodiment is lower than the brightness of color of the comparative example.

A method of producing the interior component 50 by the forming apparatus 10 will be described. As illustrated in FIG. 1, the first die 11 and the second die 20 are closed. The forming cavity S1 is formed between the forming surface 11A of the first die 11 and the forming surface 21 of the second die 20. The forming cavity S1 has a contour along the contour of the interior component 50. A black molten resin is injected from the injector 15 into the forming cavity S1 via the runner 12. The black molten resin in the forming cavity S1 is cooled down and the interior component 50 is formed (a forming process). The first die 11 and the second die 20 are opened and the interior component 50 is removed. This completes the production of the interior component 50.

The effects of this embodiment will be described. The design surface 51 of the interior component 50 is formed using the second die 20. The patterns of the forming surface 21 and the pattern of the metal layer 31 form the pattern of the design surface 51 of the interior component 50. The surface of the metal layer 31 includes the protrusions formed from grains in the metal layer 31. The. By performing the electroplating with the plating bath temperature in the range from 25 to 40 c and the current density in a range from 20 to 80 A/dm$^2$, the mean grain size can be reduced. Namely, the surface that is more likely to scatter light is formed. In comparison to a surface formed with a forming surface that is not plated or a surface formed with a forming surface that is plated under a condition other than the condition described above, the pattern of the design surface 51 formed using the pattern of the metal layer 31 is more likely to scatter light. According to the configuration, light reflectivity of the design surface 51 decreases and thus the brightness of color of the design surface 51 decreases. Therefore, the design surface 51 appears to be tinged with deeper black (a deep black tone). By reducing the brightness of color of the interior component 50, the color of the interior component 50 may better match colors of components around the interior component 50.

In the etching process, the fine third recesses 25 are formed in the base surface. Then, the metal layer 31 is formed on the forming surface 21 including the third recesses 25 by plating. A combination of the pattern formed from the third recesses 25 formed in the etching process and the pattern formed from the protrusions of the metal layer 31 formed in the plating process creates a complicated irregular pattern. Therefore, the design surface 51 of the interior component 50 including the pattern formed using the complicated irregular pattern of the forming surface 21 is more likely to scatter light and thus the design surface 51 appears to be tinged with deeper black. Because the third recesses 25 are formed by etching in the etching process, the strength of the forming surface 21 may decrease. However, the metal layer 31 is formed on the forming surface 21 and thus a proper level of the strength is maintained.

The electroetching and the electroplating are performed in the same plating bath with the polarities of the electrodes altered between the electroetching and the electroplating. Namely, separate facilities are not required for the electroetching and the electroplating as long as the electroetching and the electroplating are consecutively performed. Therefore, the facility cost can be reduced. Furthermore, it is not necessary to move the second die 20 between facilities, that is, the number of steps can be reduced.

Because the sandblasting process is performed before the plating surface forming process, the fine second recesses 24 are formed in the base surface. Then, the metal layer 31 is formed on the forming surface 21 including the second recesses 24 by plating. A combination of the pattern formed from the second recesses 24 formed in the sandblasting process and the pattern formed from the protrusions of the metal layer 31 creates a complicated irregular pattern. Therefore, the design surface 51 of the interior component 50 including the pattern formed using the complicated irregular pattern of the forming surface 21 is more likely to scatter light and thus the design surface 51 appears to be tinged with deeper black. The sizes of the second recesses 24 can be easily adjusted by altering the sizes of grains in the abrasive used in the sandblasting. Therefore, darkness of the design surface 51 is easily adjustable.

The chrome contained in the metal layer 31 has higher thermal conductivity in comparison to iron. Therefore, a partial cooldown of the forming surface 21 is less likely to occur and thus forming defects (e.g., weld line, uneven gloss) can be reduced. The chrome is harder than the iron that is the main ingredient of the second die 20, that is, highly resistant to abrasion. The chrome is suitable for the metal layer 31 formed on the forming surface 21.

Second Embodiment

Figure 15:
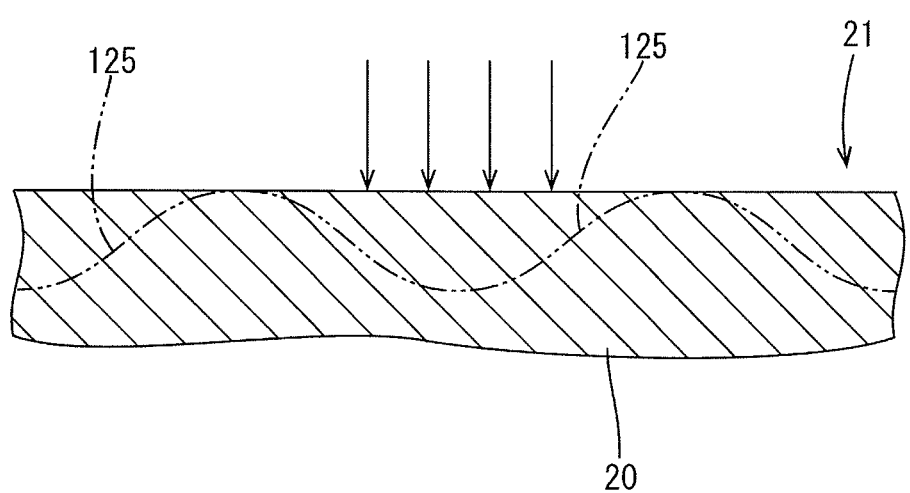
FIG. 15 is a schematic view illustrating a chemical etching process according to a second embodiment.

A second embodiment will be described with reference to FIG. 15. In this embodiment, a chemical etching is used in an etching process. As illustrated in FIG. 15, the etching process of this embodiment includes etching a base surface for a forming surface 121 of a second die 120 with an etching solution to form second recesses 125. The etching solution may be an alkaline solution (e.g., sodium hydroxide, sodium carbonate). The alkaline solution causes corrosion of an iron component included in the second die 120. It is preferable to set etching time in a range from 0.5 to 24 hours. The etching solution is not limited to the alkaline solution. An acid solution (e.g., nitric acid) may be used.

Other Embodiments

The technology described herein is not limited to the above embodiments described above and the drawings. The following embodiments may be included in the technical scope of the present invention.

(1) The forming die set is not limited to the injection molding die set as long as the forming surface of the die includes a pattern to be transferred onto a surface of a forming component. A press forming die for press forming and a vacuum forming die for vacuum forming may be included in the scope of the present invention.

(2) The metal layer may be made of metal other than chrome (e.g., nickel, copper).

(3) The interior component 50 is not limited to the upper trim or the lower trim. Onboard components having design surfaces, for example, synthetic resin skins, instrumental panels, and assist grips may be included in the scope of the present invention. The synthetic resin skins may be made of thermoplastic elastomer olefin. The interior component 50 may include multiple layers.

(4) The interior component 50 may be tinged with color other than black. Even if the interior component 50 is tinged with color other than black, the brightness of color of the interior component 50 can be reduced according to the technology described herein, (5) The forming surface 21 of the second die 20 may not include the recesses 23 to 25 and the second die 20 may include only the metal layer 31 on the forming surface 21. Furthermore, the forming surface 21 of the second die 20 may include one or two of the recesses 23 to 25.

(6) The plating bath is not limited to the configuration described earlier. A fluorosilicic acid bath including chrome acid, sulfuric acid, and fluorosilicic acid as the main ingredients may be used.

(7) The technology described herein may be applied to an interior component installed in a vehicle other than the automobile.

The invention claimed is:

1. A die for forming an interior component of a vehicle, the die comprising:
a base portion;
a forming surface on the base portion for forming a pattern on a surface of the interior component, the forming surface including:
first recesses for forming an emboss pattern on the surface of the interior component;
second recesses smaller than the first recesses, wherein the second recesses are recessed from surfaces of the first recesses; and
third recesses smaller than the second recesses, wherein the third recesses are recessed from surfaces of the second recesses,
a metal layer that includes grains, wherein the grains have a mean grain size of 5 μm or smaller,
the metal layer covering the forming surface and including protrusions on a surface of the metal layer, wherein each of the protrusions is defined by a corresponding one of the grains, wherein the protrusions are smaller than the third recesses,
each of the protrusions has a base dimension that is less than dimensions of openings of the third recesses,
the first recess, the second recesses, and the third recesses are formed over an entire area of the forming surface,
a plurality of the second recesses are located within each of the first recesses,
a plurality of the third recesses are located within each of the second recesses, and
a plurality of the protrusions are disposed in each of the third recesses wherein the individual metal grains cooperate to form the third recesses.

2. The die according to claim 1, wherein the plurality of the protrusions are coupled to one another.

3. The die according to claim 1, wherein the first recesses are separated from each other.

4. The die according to claim 1, wherein the second recesses are separated from each other.

5. The die according to claim 3, wherein some of the second recesses are located-between the first recesses.

6. The die according to claim 4, wherein some of the third recesses are located between the second recesses.

7. A method of producing a die according to claim 1 for forming an interior component of a vehicle, the method comprising:
setting a temperature of a plating bath in a range from 25 to 40° C.;
immersing at least a forming surface on a base for the die in a plating bath; and
feeding a current to the forming surface with a current density in a range from 20 to 80 A/dm$^2$ until a metal layer is formed on the forming surface.

8. The method according to claim 7, further comprising etching a base surface of the base before immersing the forming surface in the plating bath, wherein the base surface is a base for the forming surface.

9. The method according to claim 8, wherein the etching uses an electroetching.

10. The method according to claim 7, further comprising sandblasting the base surface before immersing the forming surface in the plating bath.

11. The method according to claim 9, wherein
the etching includes:
immersing at least the base surface in the plating bath;
connecting the base surface in the plating bath to a positive terminal of a power source; and
connecting an electrode in the plating bath to a negative terminal of the power source, and
the feeding the current to the forming surface includes:
connecting the forming surface in the plating bath to the negative terminal of the power source; and
connecting the electrode in the plating bath to the positive terminal of the power source.

12. The method according to claim 11, further comprising:
applying an acid-resistant material to the base surface in a pattern corresponding to a pattern to be formed on a surface of the interior component of the vehicle before immersing the base surface in the plating bath; and
immersing at least the base surface in an acid solution before immersing the base surface in the plating bath.

* * * * *